United States Patent [19]

Kim

[11] Patent Number: 4,653,194
[45] Date of Patent: Mar. 31, 1987

[54] COMPOSITE-TYPE RULER

[76] Inventor: Yoon H. Kim, 19812 50th W. #614, Lynnwood, Wash. 98036

[21] Appl. No.: 788,884

[22] Filed: Oct. 18, 1985

[51] Int. Cl.⁴ .............................................. B43L 7/00
[52] U.S. Cl. ...................................... 33/429; 33/451; 33/DIG. 1
[58] Field of Search ................. 33/429, 427, 428, 464, 33/483, 484, 494, DIG. 1, 451

[56] References Cited

U.S. PATENT DOCUMENTS

| | | | |
|---|---|---|---|
| 2,382,250 | 8/1945 | Newell | 33/429 |
| 2,900,729 | 8/1959 | Basile | 33/451 |
| 3,503,131 | 3/1970 | Warner | 33/427 |
| 4,128,030 | 12/1978 | Kundikoff | 33/429 X |
| 4,352,247 | 10/1982 | Rohde | 33/428 |

Primary Examiner—William D. Martin, Jr.
Attorney, Agent, or Firm—Fleit, Jacobson, Cohn & Price

[57] ABSTRACT

A square is usable in association with a tape ruler. The square includes a ruler member as a base bar and a transverse longitudinal member formed at one side of the ruler member. An arc member is formed at the other side of the ruler member. A pair of guides are provided at the front and back surfaces of the ruler member. Each guide has two guiding grooves for receiving a respective tape ruler of different width. A permanent magnet is buried in each guide in order to maintain engagement between the guide and the tape ruler when the square is slid along the tape ruler.

3 Claims, 6 Drawing Figures

COMPOSITE-TYPE RULER

BACKGROUND OF THE INVENTION

The present invention relates to a composite-type ruler enabling an easy drawing of vertical lines, right-angled lines, diagonal lines, and curved lines, as well as a measuring of a horizontal plane of an object. The ruler can also be optionally used in association with a tape ruler.

Heretofore, various types of rulers have been known. For example, there is a composite-type ruler for drawing right-angled lines and diagonal lines forming an angle of 45° therebetween as well as measuring a horizontal plane of an object. The ruler comprises a moveable member having a vertical edge at one side thereof and a diagonal edge at the other side thereof. The moveable member has a guiding groove at the bottom thereof. A straight ruler member is slideably fitted into said guide groove and held at a desired position relative to the moveable member by means of a threaded hole provided at said moveable member and a screw fitted into said hole. In this construction, the screw is likely to release from the hole, thereby causing an inaccuracy in the drawing of right-angled lines or diagonal lines. In this case, a draftsman should again tighten the screw. If the moveable member is required to move with respect to the ruler member, the draftsman should always release and tighten the screw. This work is very cumbersome. Over a long period of use, there is a problem of an inaccuracy in drawing due to the worn states of the screw and the guiding groove.

On the other hand, where parallel lines are to be drawn on a long plate, the following manner has been conventionally utilized. A straight ruler is once placed at one side of the plate. Then, a draftsman marks points spaced a desired distance from one another at said side of the plate, depending upon the scales of said ruler. Thereafter, the ruler is displaced to the other side of said plate and then the above-mentioned work is repeated at said other side of the plate to mark points respectively corresponding to those on said one side of the plate. Then, the straight ruler is transversally disposed on the plate such that respective two points marked at respective sides of the plate and corresponding to each other are aligned on the edge of said ruler in order to draw a line. In this condition, parallel lines can be drawn along the edge of plate, as the ruler is sequentially displaced. This method, however, creates double work for marking a distance between parallel lines. To find accuracy in making points, it is required to compare all points one by one with the scales of ruler. Where incorrectly marked-points are present, the correcting work is troublesome and wasteful in terms of time.

SUMMARY OF THE INVENTION

Accordingly, an object of the present invention is to provide a composite-type ruler enabling an easy drawing of vertical lines, right-angled lines, diagonal lines, and curved lines, as well as a measuring of a horizontal plane of an object, so that the above-mentioned disadvantages encountered in the prior art may be overcome.

According to the present invention, this object is accomplished by providing a composite-type ruler comprising a ruler member having scales at both edges and a straight member integrally formed with one end of said ruler member at one edge of said ruler member and provided with upper and lower edges each forming a right angle with respect to said edge of the ruler member, said ruler further comprising: an arc member integrally formed with said end of the ruler member at the other edge of said ruler member and provided with an outer semicircular edge and an inner, inclined straight edge forming an angle of 45° with respect to said edge of the ruler member; a guide provided at each surface of said ruler member and having two guiding grooves for receiving respective tape rulers with different widths, said grooves each having a width and a cross-sectional shape corresponding to those of said tape rulers; a permanent magnet buried into said guide and adapted to maintain an engagement between said guide and the tape ruler.

According to the present invention, the ruler comprises a step formed on the inclined edge of said arc member at each surface of the arc member and extended along a line aligned with the lower edge of said straight member, and a step forward on the edge of said ruler member adjacent said inclined edge of the arc member at each surface of said ruler member and positioned near the corner defined by said edge of the ruler member and said inclined edge of the arc member. The letter step forms a right angle with respect to said inclined edge of the arc member.

According to the present invention, the straight member and the arc member each are provided with a level and a pair of openings for exposing said level.

This arrangement of ruler permits an easy drawing of right-angled lines and diagonal lines as well as curved line. Furthermore, it is possible to measure a horizontal surface of an object. And also, the ruler can be effectively used in association with a tape ruler.

BRIEF DESCRIPTION OF THE DRAWINGS

Other objects and advantages of the present invention will be apparent to those skilled in the art to which the invention relates from the following detailed description of preferred embodiments of the invention made with reference to the accompanying drawings in which.

DETAILED DESCRIPTION OF THE PREFERRED EMBODIMENT

Figure 1:
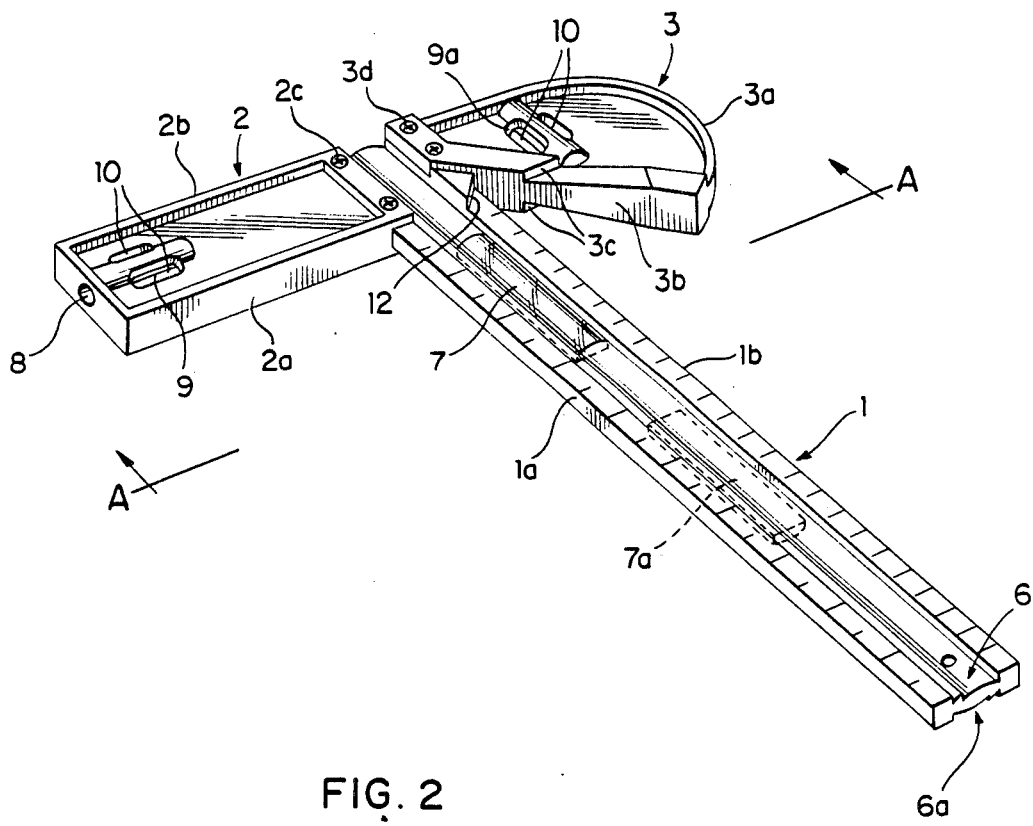
FIG. 1 is a perspective view of a composite-type ruler according to the present invention.
Figure 2:
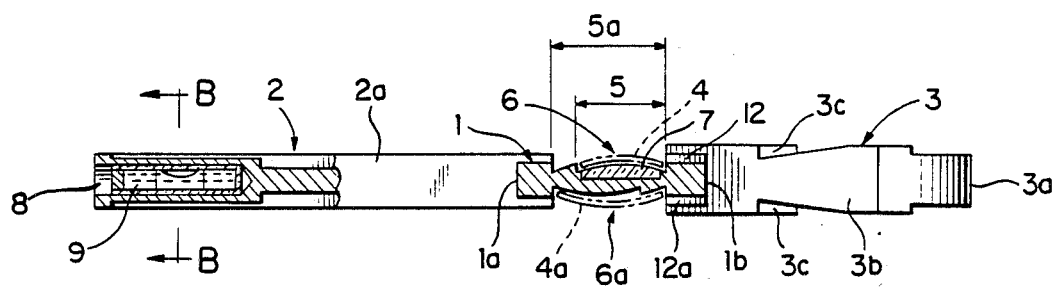
FIG. 2 is a partial cross sectional view taken along the line A—A of FIG. 1.

Referring to FIG. 1, a composite-type ruler comprises a vertical ruler member 1 having scales at both edges 1a and 1b thereof. At one end of the ruler member 1, a straight member 2 is fixed to one edge 1a of said ruler member 1 (that is, left edge in FIG. 1) by means of screws 2c, such that a lower edge 2a of said straight member 2 forms a right angle with respect to said edge of ruler member 1. The straight member 2 has a width which is substantially identical to that of the ruler member 1. Opposite to said straight member, an arc member 3 having an outer semi-circular edge 3a is fixed to the other edge 1b of said ruler member 1 (that is, right edge in FIG. 1) by means of screws 3d, such that an inner, inclined straight edge 3b of said arc member 3 forms an angle of 45° with respect to the edge 1b of said ruler member 1.

The ruler member 1 has at front and back surfaces thereof a pair of guides 6 and 6a for guiding a tape ruler, respectively. Each guide includes narrow and wide guide grooves 5 and 5a which have corresponding widths to receive tape rulers having widths of, for example, ¾" and 1", respectively. Each guide 6 or 6a is provided with a permanent magnet 7 or 7a which is buried into the guide such that an outer surface of said magnet is flush with the outer surface of the guide.

Figure 3:
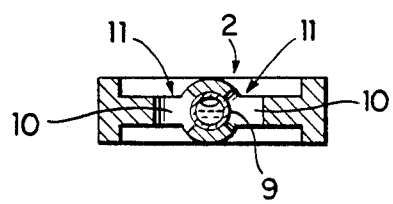
FIG. 3 is an end view taken along the line B—B of FIG. 2.
Figure 4:
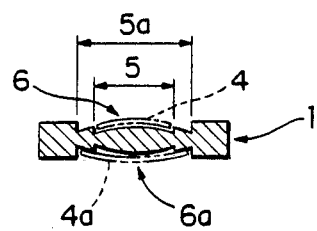
FIG. 4 is a cross-sectional view of guide of a different type from those of FIG. 3.

The straight member 2 and the arc member 3 each have a hole 8 facing outward, which extends in directions parallel and vertical, respectively to the ruler member 1 when viewed from the top plane and receives a conventional level 9 or 9a. As shown in FIG. 3, wall portions defining holes 8 are partially opened at both sides thereof to form a pair of openings 10 through which indices of each level 9 or 9a can be viewed in direcions indicated by arrows 11.

At respective front and back surfaces of the arc member 3, the inclined edge 3b of arc member 3 is provided with steps 3c extended along a line aligned with the lower edge 2a of the straight member 2. At respective front and back surfaces of the ruler member 1, the edge 1b of ruler member is provided with steps 12 at a corner area where the inclined edge 3b of arc member 3 is joined with the edge of ruler member 1. Each step 12 forms an angle of 90° with respect to the inclined edge 3b of the arc member 3. In the drawings, reference numerals 13 and 14 designate a scale, 15 a plate, and 16 a writing instrument.

Figure 5A:
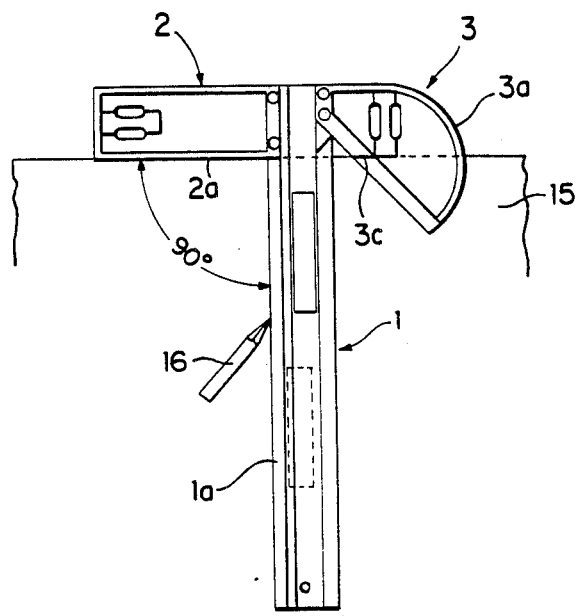
FIGS. 5 and 6 are views each showing different uses of the ruler.

Hereinafter, using examples of composite-type ruler according to the present invention are described with reference to FIG. 5 FIG. 5(a) shows a condition under which the lower edge 2a of the straight member 2 and the step 3c of the inclined edge 3b of the arc member 3 at the side of back surface are engaged with the edge of plate 15. In this condition, the ruler 1 is vertically placed on the plate. Accordingly, it is possible to draw a vertical line along the one edge of the ruler member 1 by means of a writing instrument 16. This vertical line indicates an angle of 90°, thereby allowing a certain object to be measured for having an angle of 90°.

Figure 5C:
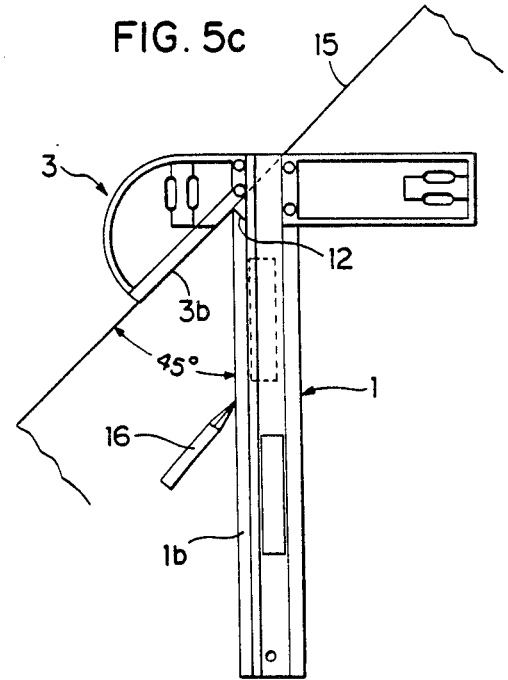
Figure 5B:
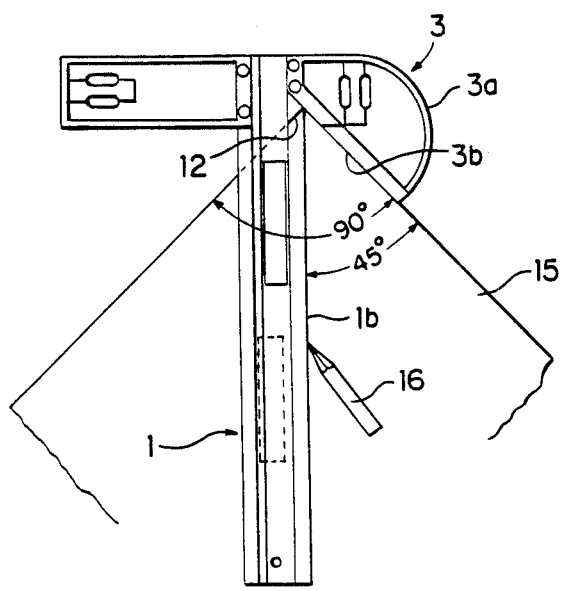

FIG. 5b shows a condition under which the inclined edge 3b of the arc member 3 and the step 12 are engaged with a right-angled corner of the plate 15. In this condition, the other edge 1b of the ruler member 1 is vertically placed on the middle portion of the plate 15. If a line is drawn along the edge 1b of the ruler member 1 by means of the writing instrument 16, then this line forms an angle of 45° with respect to an edge of the plate 15. Accordingly, this vertical line allows a certain object to be measured for having an angle of 45°.

FIG. 5(c) shows a case where a line is drawn which forms an angle of 45° with respect to an edge of the plate 15. By this line, a certain object can be measured for having an angle of 45°. To this end, the inclined edge 3b of the arc member 3 under the condition of reversing the ruler is engaged with an edge of the plate 15. If a straight line is drawn along the edge 1a of the ruler member 1 by means of the writing instrument 16, then the line forms an angle of 45° with respect to the edge of plate 15, thereby allowing a certain object to be measured for having an angle of 45°.

Figure 6:
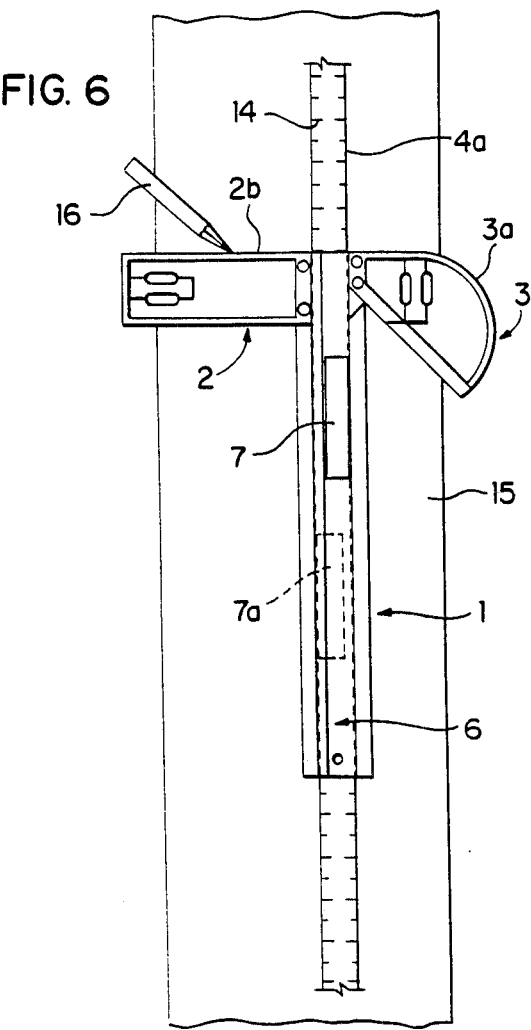

FIG. 6 shows a case of drawing parallel lines spaced with a desired distance from one another. In this case, a metal tape ruler 4a having a width of, for example, 1" is longitudinally placed on the plate 15, such that a holder (not shown) fixed to the end of tape ruler 4a is engaged with the edge of plate 15. Then, both longitudinal sides of said tape ruler are pressed upon the plate 15 by weights (not shown). Thereby, the tape ruler 4a is fixedly held with respect to the plate. Then, the ruler is disposed on the tape ruler, such that the wide guiding groove 5a of the ruler member 1 fitably receives the tape ruler 4a (in the case of ¾" tape ruler, narrow guiding groove 5 receives the tape ruler). At this time, the magnet 7a provided at the guide 6a forcedly draws the tape ruler 4a. Thereby, it is assured that an engagement between the groove and the tape ruler even when the ruler is longitudinally moved along the tape ruler is maintained. Accordingly, parallel lines spaced with a certain distance from one another can be drawn on the plate 15 by sequentially moving the ruler along the tape ruler by required distances as the upper edge 2b of straight member 2 is aligned with the scale of tape ruler 4a. On the other hand, the semi-circular edge 3a of arc member 3 can be effectively utilized to draw the object with rounded corners.

As described hereinbefore, the ruler of the present invention comprises a ruler member 1 as a base bar, a straight member 2 formed integrally with and at one side of said ruler member, and an arc member 3 formed integrally with and at the other side of said ruler member, said straight member and arc member each being provided with a level. Accordingly, the ruler permits an easy drawing of right-angled lines and diagonal lines as well as curved lines. And also, it is possible to measure a horizontal surface of an object. In addition, the ruler can be effectively used in association with a tape ruler.

What is claimed is:

1. A square comprising
    a ruler member having a front surface and a back surface and two edges extending along both of said front surface and said back surface,
    a longitudinal member integrally formed with one end of said ruler member at one edge of said ruler member and provided with upper and lower edges each forming a right angle with respect to said one edge of said ruler member,
    an arc member integrally formed with said one end of said ruler member at the other edge of said ruler member and provided with an outer semi-circular edge and an inner, inclined straight edge forming an angle of 45° with respect to said other edge of said ruler member,
    a guide provided at each of said front surface and said back surface of said ruler member, said guide having two guiding grooves for receiving respective tape rulers with different widths, said grooves each having a width and cross-sectional shape corresponding to those of the tape rulers, and
    a permanent magnet buried in said guide and adapted to maintain an engagement between said guide and the tape ruler.

2. A square according to claim 1, further comprising a step formed on said inclined edge of said arc member at each of a front surface and a back surface of said arc member and extended along a line aligned with said lower edge of said longitudinal member, and a step formed on said other edge of said ruler member adjacent said inclined edge of said arc member at each surface of said ruler member and positioned near a corner defined by said other edge of said ruler member and said inclined edge of said arc member, said step forming a right angle with respect to said inclined edge of said arc member.

3. A square according to the claim 1, wherein said longitudinal member and said arc member each are provided with a level and a pair of openings for exposing said level.

* * * * *